United States Patent [19]
Frischmuth, Jr.

[11] 3,951,620
[45] Apr. 20, 1976

[54] SEPARATION APPARATUS AND PROCESS

[75] Inventor: Robert W. Frischmuth, Jr., Huntington Beach, Calif.

[73] Assignee: Shell Oil Company, Houston, Tex.

[22] Filed: Sept. 19, 1974

[21] Appl. No.: 507,311

[52] U.S. Cl. .................................. 55/1; 55/319; 55/399; 55/456; 55/459 A
[51] Int. Cl.² ............................................. B01D 45/00
[58] Field of Search ............ 55/1, 41, 52, 191, 199, 55/204, 319, 399, 456, 459; 209/144, 211; 210/512

[56] References Cited
UNITED STATES PATENTS

| | | | |
|---|---|---|---|
| 2,010,128 | 8/1935 | Arnold | 55/459 X |
| 2,252,581 | 8/1941 | Saint-Jacques | 55/456 X |
| 2,568,032 | 9/1951 | Stephanoff | 55/459 |
| 3,396,513 | 8/1968 | Humphreys | 55/191 |

Primary Examiner—Charles N. Hart
Assistant Examiner—Richard W. Burks

[57] ABSTRACT

Particulate solids are separated from their admixture with gases by passage through a cyclone separator, wherein the solids are guided down the lower conical section thereof by helical channels which minimize recirculation of the particles and thereby minimize agglomeration thereof.

4 Claims, 3 Drawing Figures

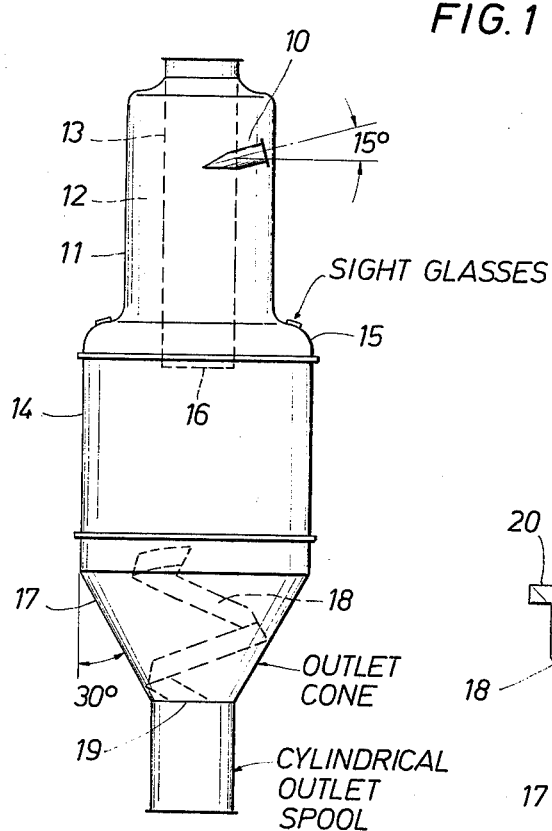
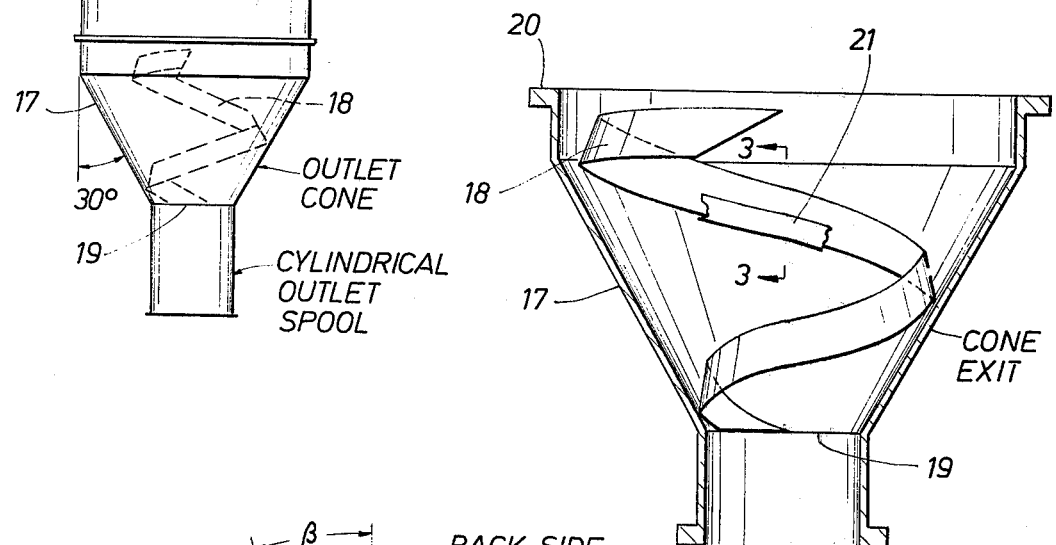
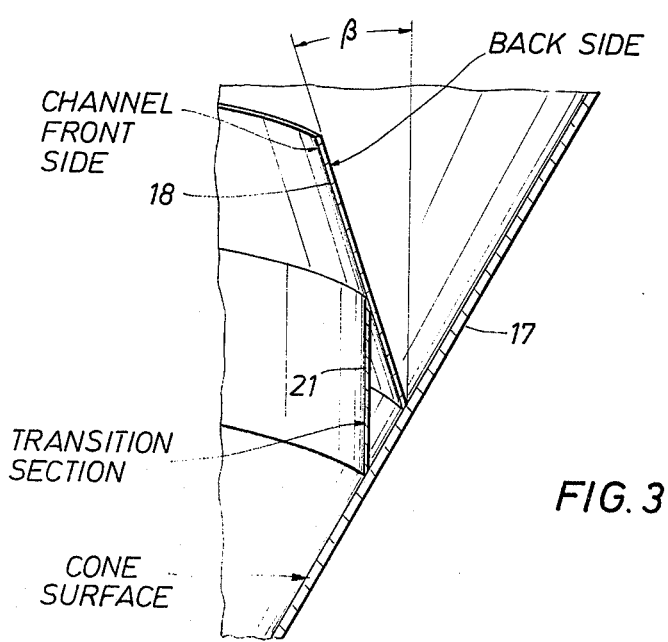

SEPARATION APPARATUS AND PROCESS

BACKGROUND OF THE INVENTION:

A number of synthetic polymer processes involve the preparation of particulate solids as an end product which must be separated from suspending gases or vapors. With many polymeric materials this has proved to be a difficult problem since the particles in many cases either tend to be recirculated in the rapidly moving gases and are thereby lost, or, on the other hand, tend to recirculate within heated areas so that collisions occur between the particles, causing particle agglomeration and fouling of the apparatus through which they are passing. The gaseous suspensions of solids may result from many processes, but those especially contemplated here involve reaction mixtures which may comprise solutions of a polymer which are passed through contacting devices resulting in vaporization of solvents, and formation of polymeric particulate solids in suspension. In many instances this vaporization is effected by contact with high temperature vapors such as steam or hot inert gases such as nitrogen and the like.

The use of ordinary cyclones has been found unsatisfactory for separation of many polymers which tend to agglomerate as described above. The fouling of separation apparatus means that plant downtime will be required to remove deposited solids.

OBJECT OF THE INVENTION:

It is an object of the present invention to provide an improved separation process for mixtures of particulate solids from suspended gases. It is a further object of the invention to provide an improved apparatus for carrying out this process. Other objects will become apparent during the following detailed discussion of the invention.

STATEMENT OF THE INVENTION:

Now, in accordance with this invention, a novel cyclone separator construction is provided combining an upper barrel containing a gas outlet pipe concentric therewith, the walls of the barrel and the pipe forming an annular space having at the upper portion thereof at least one jet inlet, positioned to introduce particulate solids-laden gases tangentially into the barrel. This upper barrel is positioned at the top of a lower barrel, and the bottom end of the gas outlet pipe terminates in the upper area of this lower barrel. Gases begin to separate from the mixture and pass up the gas outlet, while the particulate solids continue with their tangential path down the sides of the lower barrel. The upper and lower barrels may be of the same diameter, or the lower barrel may be of greater diameter, joined to the upper barrel by a hip. The hip formed by the joint of the upper and lower barrels encourage the downward flow pattern of the solids and the upward flow of the gases being separated therefrom. The particles continue down the barrel until they meet an inverted, truncated cone; the larger, open-face of which is connected at the lower edge of the lower barrel. The present invention especially contemplates fitting this cone with at least one helical channel which diverts the descending particulates in a downward direction toward the exit and thereby minimizes their recirculation and agglomeration. In still further accord with the present invention, an improved separation occurs when these channels are modified by essentially vertical transition strips, positioned to connect a point on the bottom of the channel with a point on the sloping face of the cone.

FIG. 1 constitutes a cutaway side view of the of the assemblies of this invention. FIG. 2 is an enlarged side view of the conical section of the separator, together with an attached channel. FIG. 3 constitutes a close-up view of a channel in cross-section with the transition strip attached both to the channel and the cone surface.

The particles especially contemplated may result as referred to herewithbefore from said solution process for solution polymerization. Typical of these are the processes involved in anionic polymerization of unsaturated monomers such as conjugated dienes, monoalkenyl arenes or their mixtures, to form in solution homopolymers, random copolymers, tapered copolymers, or block copolymers, and including solution processes for the formation of comb polymers. Hydrogenated derivatives of such polymers also are contemplated. In many instances these processes will entail the use of "living polymer" techniques, primarily employing a polymerization initiator, such as lithium-based initiators, including lithium alkyls. These processes are well known in the art, and do not in themselves form a part of the present invention.

Polymeric solution which is usually referred to as cement, is subjected, usually under conditions of shear, to high temperatures, normally in the form of superheated steam, and passed under high velocities through an ejection nozzle under such conditions as to instantaneously convert the solvents and any condensed steam into a gaseous state and convert the dissolved solids into particles which may be of a variety of sizes, from a few microns up to a fractional portion of an inch. The jet inlet described as injecting the mixture of solids and gas into the upper portion of the separator may be the jet outlet of the steam contactor.

FIG. 1 illustrates a preferred arrangement of the elements of the cyclone separator of this invention. According to FIG. 1, a jet inlet 10 is positioned in the upper portion of barrel 11 so as to introduce particulate solids-laden gases tangentially into the annular space 12 formed by the barrel walls and the walls of the gas outlet pipe 13. The mixture proceeds at high speed, e.g., at least 700 feet per second, and preferably at least 1000 feet per second, in a tangential path down the walls of the upper barrel to flow into the larger, lower barrel 14. Rounded shoulders are preferred at the junction formed between the upper barrel 11 and the lower barrel 14 so as to minimize the formation of polymer build-up on the walls at this point. However, under some circumstances, and with some polymers, it may be possible to form a right angle junction instead of the curved junction 15 as shown. FIG. 1 also shows that the gas exit pipe 13 has its bottom open end 16 terminating about at the upper portion of the lower barrel 14. A large proportion of the gases separate at this point, and pass up the gas outlet 13 to exit into collecting apparatus not shown. The gas outlet pipe, extending as it does, down into the separator, minimizes the tendency of the particulates to remix with the gases. The particulates and any remaining gases continue on a high speed tangential path down the sides of the lower barrel 14 until they meet the cone 17 — forming the lower portion of the separator. As described hereinbefore, this cone may be referred to as an inverted, truncated cone, the open larger face being uppermost and directly connected with the lower edge of the lower barrel 14. In dotted outline, the essential element of the present invention is shown as helical channel 18. The number of such helical channels (or baffles) will depend on the conditions employed, such as velocities, or temperature, and polymer identity. With many polymers having agglomerating tendencies or a tendency to soften at high temperature, at least two such channels are preferred. The cone 18 terminates in the lower face 19, which leads to an exit connecting with downstream apparatus such as degassing, drying and collecting equipment, not shown.

FIG. 2 is a close-up view of the cone containing a baffle with an indication of transition section or strip attached thereto. The slope of the sides of the cone are preferably between about 10°–40°, or still more preferably, between about 15°–35°. According to FIG. 2 cone 17 is represented as having sides sloping at 30°. The upper portion indicates a flange 20 used for connection with the lower portion of the lower barrel 14, shown in FIG. 1. The helical channel 18 is indicated as a single installation together with a typical portion of transitional strip 21.

FIG. 3 shows a closeup sectional view of channel 18 with an associated transitional section 21 supported on the inner face of the cone 17.

It was found in tests made leading to this invention that, with many polymers, the helical channels encouraged the downward movement of the particulate solids with a resulting minimum of recirculation and agglomeration. In accordance with one aspect of this invention, the angle beta (B) is preferably between 7°–25° from the vertical and still more preferably between about 8°–20°. The transition sections, on the other hand, preferably vary only insignificantly from a vertical position.

In a typical operation of the process and apparatus of this invention, a solution was prepared comprising cyclohexane having dissolved therein 13% by weight of a block copolymer. This copolymer had a structure polystyrene-hydrogenated polybutadiene-polystyrene, wherein the average block molecular weights were 25,000–100,000–25,000. The solution was contacted with steam at a temperature of about 300°–400°F the steam-to-cement weight ratio being about 0.8. The mixture was passed under a pressure of about 300 psig through the jet inlet and thereby into the apparatus illustrated in FIG. 1. The conditions employed vaporized essentially all of the cyclohexane and maintained substantially all of the steam in vapor state. The material passed down the cyclone separator and exited at the bottom thereof. When two helical channels were employed in the conical bottom section, no disadvantageous agglomeration occurred, and fouling of the interior surfaces was held at a minimum. In the absence of the helical channel, substantial agglomeration of many particles occurred, as well as increased loss of fines through the gas exit.

What is claimed is:

1. A cyclone separator for the separation of gases from polymer particles including an upper barrel, a gas outlet, a lower barrel, and a truncated cone below said lower barrel wherein:
   a. at least one jet inlet is positioned to the upper part of the upper barrel for introducing particulate solids-laden gases tangentially into the barrel;
   b. the upper barrel is positioned on the top end of the lower barrel;
   c. the gas outlet is of smaller diameter and concentric with the upper barrel and extends into the upper part of the lower barrel;
   d. the bottom end of the lower barrel being positioned on the widest face of the truncated cone;
   e. said cone being fitted with at least one helical channel along the inner face of the cone leading to the outlet, said outlet comprising the smaller face of the truncated cone;
   f. and an essentially vertical transition strip positioned to have one end thereof supported by the cone and the opposite end thereof supported by the channel.

2. A separator according to claim 1 wherein there are two helical channels fitted to the cone.

3. A separator according to claim 1 wherein the angle of inclination beta of FIG. 3 of the channel is between 7° and 25° beyond the vertical.

4. A process for the separation of polymeric particulate solids from their admixture with gases which comprises:
   a. injecting the mixture at a vapor velocity of at least 700 ft. per second from a nozzle into the annular space of an upper barrel of a separator, said nozzle being positioned to direct the mixture into the space tangentially;
   b. passing the mixture down the annular space to a larger lower barrel, allowing gases to exit through a gas exhaust, the walls of which are concentric with those of the upper barrel, the two walls forming the annular space;
   c. passing the solids and remaining gases down the lower barrel to the upper large face of a truncated cone, said cone being fitted with at least one helical channel, said channel guiding the solids to the lower small face of the cone and an essentially vertical transition strip positioned to have one end thereof supported by the cone and the opposite end thereof supported by the channel, and
   d. passing the separated solids through the face to an exit.

* * * * *